Patented Sept. 15, 1931

1,823,480

UNITED STATES PATENT OFFICE

GEORGE WITTY, OF NEW YORK, N. Y., ASSIGNOR, BY DIRECT AND MESNE ASSIGNMENTS, TO STRUCTURAL PRODUCTS CORPORATION, A CORPORATION OF DELAWARE

ENAMEL AND METHOD OF MAKING SAME

No Drawing.   Application filed April 1, 1930.   Serial No. 440,867.

In the manufacture of enamels, stannic oxide, zirconium oxide, calcium fluoride, lithopone and nitro cellulose have been largely employed as the most satisfactory agents. Owing to the high cost of the above mentioned ingredients, many attempts have been made to produce a satisfactory substitute, but such substitutes have not been productive of satisfactory results.

The object of the present invention is to provide an enamel which is hard, durable, resistant to wear and weather, and which will not crack, chip or peel off.

Another object of the invention is to produce an enamel which will retain permanently its opacity, whiteness and brilliancy and which is adapted for application by spraying and brushing.

A further object of the invention is to provide an enamel suitable for the addition of delicate colorings, dyes, pigments, etc. because of its chemical inertness which in no way affects or modifies the most delicate shades.

The composition comprises the following ingredients in the proportions named:—white lead, from 50 to 75 parts by weight; zinc oxide, from 25 to 50 parts by weight; pulverized barium fluoride, from 5 to 10 parts by weight; China wood oil, from 10 to 15 parts by weight; linseed oil, from 5 to 10 parts by weight; turpentine, from 10 to 20 parts by weight; gum Manila copal, from 5 to 10 parts by weight; ethyl alcohol, from 50 to 70 parts by weight; acetic ether, from 30 to 50 parts by weight.

In preparing the composition, the white lead, zinc oxide and barium fluoride are placed in a paint mixing machine of commercial use and made into a homogeneous composition in the presence of China wood oil, linseed oil and turpentine. The gum Manila copal is dissolved in an iron tank in the presence of ethyl alcohol and acetic ether, the mixture being stirred occasionally until the whole is dissolved.

Allow to settle until clear, then pour the clear solution into the mixing machine containing the lead, zinc and barium fluoride mixture thoroughly mixed and passed through a paint mill or any other suitable machine adapted for the purpose and grind the composition in the same manner generally used in making commercial enamels.

The composition can, of course, be greatly varied without departing from the spirit of my invention.

The invention having been described, what is claimed as new and useful is:—

1. An enamel consisting of a mixture of white lead, zinc oxide, barium fluoride, China wood oil, linseed oil, turpentine, gum Manila copal, ethyl alcohol and acetic ether.

2. An enamel consisting of from 50 to 75 parts by weight of white lead, from 25 to 50 parts by weight of zinc oxide, from 5 to 10 parts by weight of barium fluoride, from 10 to 15 parts by weight of China wood oil, from 5 to 10 parts by weight of linseed oil, from 10 to 20 parts by weight of turpentine, from 5 to 10 parts by weight of gum Manila copal, from 50 to 70 parts by weight of ethyl alcohol and from 30 to 50 parts by weight of acetic ether.

In testimony whereof, I affix my signature.

GEORGE WITTY.